July 31, 1934.  F. SCHMIETT  1,968,357
HOSE AND PLANT PROTECTOR
Original Filed Oct. 13, 1931
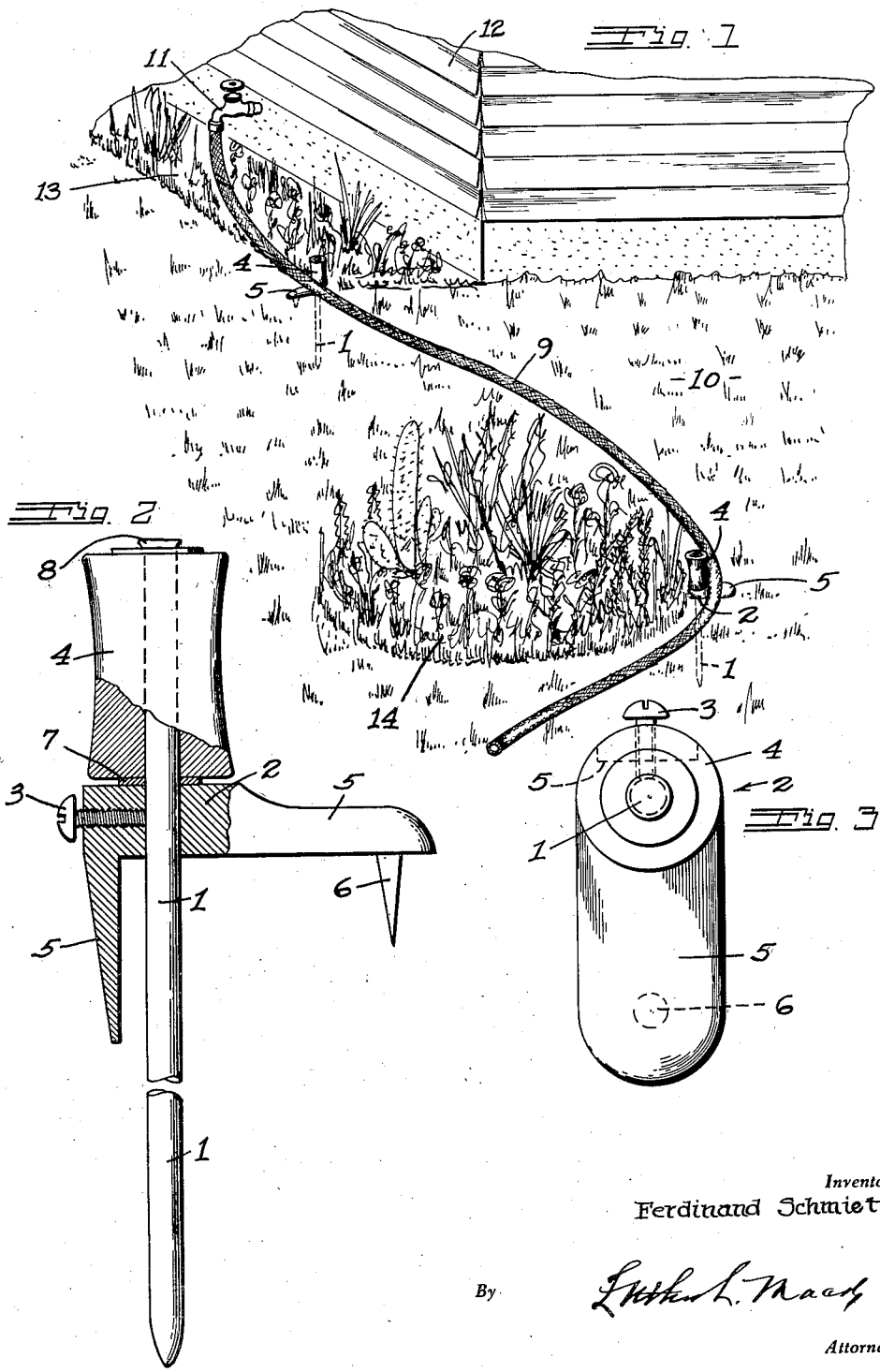
Inventor:
Ferdinand Schmiett,
By
Attorney Patented July 31, 1934

1,968,357

UNITED STATES PATENT OFFICE 1,968,357

HOSE AND PLANT PROTECTOR

Ferdinand Schmiett, Los Angeles, Calif.

Application October 13, 1931, Serial No. 568,586
Renewed December 16, 1933

4 Claims. (Cl. 254—190)

This invention relates to and has for an object the provision of an effective device adapted to be detachably positioned at the margins of planted areas, flower beds, buildings, etc., on lawns, as guards and protectors over which a garden hose may be extended to prevent the chafing of the hose against obstructions and damage to shrubs in the planted areas.

Another object is to provide a simple, economical and efficient device embodying a stem or stake adapted to be forced into the ground, a head mounted on the stem and having a shoe overlying the ground for slidably receiving and supporting a garden hose, and a roller rotatably mounted on the stem above the base for facilitating the movement of the hose over the protector and for reducing the friction on the periphery of the hose and the consequent wear or abrasion thereof.

I have shown a preferred form of device in the accompanying drawing, in which

Fig. 1 is a perspective view of a portion of a lawn with a building and planted areas thereon with protectors embodying my improvements arranged to support a hose for use.

Fig. 2 is an enlarged elevation of my improved protector partly in section.

Fig. 3 is a top plan view of the protector.

The device as shown includes a stem 1, preferably of wrought iron, which is pointed at its lower end so that it may be readily driven or forced into the ground, a base 2 which is detachably but non-rotatably held on the stem 1 by means of a set screw 3, and a roller 4 rotatably held on the upper end of the stem 1 above the base 2.

Said base is provided with a downwardly extended prong 5 of substantial length at its rear end which is spaced rearwardly from the stem 1 and may be pointed at its lower end so as to pierce the ground below the body of the base 2 and prevent the rotation of the base. Said base also has a forwardly extended shoe 5, preferably of arcuate cross section, transversely thereof, and may be provided with a relatively short prong 6 near its end to cooperate with the prong 5 for preventing the rotation of the base. In many cases the prong 6 may be omitted, and it will be understood that the same is in no case necessary or material to this invention.

The roller is preferably of concave form as shown, and is mounted upon a washer 7 adjacent the upper side of the base 2. Said roller is held from displacement by upsetting the upper end 8 of the stem 1 so as to enlarge said end as shown. Thus the several elements of the protector may be readily assembled or disassembled by tightening or loosening the set screw 3. It is apparent that when the screw 3 is loosened the base 2, washer 7 and roller 4 may be removed from or positioned on the stem at will.

As shown in Fig. 1, an ordinary rubber covered garden hose 9 may be protected against abrasion of its outer surface and the movement thereof facilitated to different locations on a lawn, as at 10, when the hose is attached to a faucet 11 and is extended over the shoes 5 and in contact with the rollers 4. Preferably the protectors are positioned at the margins or corners of a building, as at 12, or flower beds or other planted areas 13, 14.

The protectors are of light weight and of either forged or cast metal so as to provide sturdiness and durability, and a sufficient number of devices may be used on a lawn for the purpose of protecting both the hose and the shrubbery within the planted areas 13, 14 etc.

The simplicity, economy and efficiency of a device of the character shown and described will be readily appreciated and understood by those familiar with the use of garden hose for the purpose of sprinkling lawns and the like.

What I claim is:

1. A hose and plant protector comprising a stem, a base adjustable on said stem and having a shoe adapted to overlie the surface of the ground for slidably receiving a garden hose, said shoe having prongs on the bottom thereof, which, together with said stem are adapted to be forced into the ground, and a roller rotatably mounted on said stem above said base for rolling engagement with the hose, the upper end of said stem being provided with means for preventing the displacement of said roller.

2. A combined hose and plant guard comprising a stem having an enlargement at its upper end and a pointed lower end adapted to pierce the ground, a base detachably held on and intermediate the ends of said stem, and a roller mounted on said stem intermediate said enlarged upper end and said base, said base having a lateral projection adapted to overlie the surface of the ground for slidably receiving a hose, and a pair of prongs in the bottom thereof for piercing the ground.

3. A combined hose and plant guard comprising a stem having an enlargement at its upper end and a pointed lower end adapted to pierce the ground, a base detachably held on and intermediate the ends of said stem, and a roller mounted on said stem intermediate said enlarged upper end and said base, said base having depending prongs formed on the bottom thereof for piercing the ground to prevent the rotation of the base during use.

4. A combined hose and plant guard comprising a stem having an enlargement at its upper end and a pointed lower end adapted to pierce the ground, a base adjustably held on and intermediate the ends of said stem, a roller mounted on said stem intermediate said enlarged upper end and said base, said base having prongs formed on the bottom thereof for piercing the ground to prevent the rotation thereof during use, and an extension on said base adapted to overlie the surface of the ground to slidably receive a hose.

FERDINAND SCHMIETT.